(12) United States Patent
Zelig et al.

(10) Patent No.: US 8,487,597 B2
(45) Date of Patent: Jul. 16, 2013

(54) CONTROLLED POWER SUPPLY AND METHOD FOR PULSE LOAD

(75) Inventors: Robert Zelig, Ashdod (IL); Enrique Batikoff, Nes Tziona (IL)

(73) Assignee: Elta Systems Ltd., Ashdod (IL)

( * ) Notice: Subject to any disclaimer, the term of this patent is extended or adjusted under 35 U.S.C. 154(b) by 646 days.

(21) Appl. No.: 12/530,674

(22) PCT Filed: Mar. 6, 2008

(86) PCT No.: PCT/IL2008/000296
§ 371 (c)(1),
(2), (4) Date: Sep. 10, 2009

(87) PCT Pub. No.: WO2008/111046
PCT Pub. Date: Sep. 18, 2008

(65) Prior Publication Data
US 2010/0102787 A1    Apr. 29, 2010

(30) Foreign Application Priority Data
Mar. 11, 2007  (IL) .......................................... 181843

(51) Int. Cl.
*G05F 1/10*  (2006.01)
(52) U.S. Cl.
USPC .......................................... 323/282; 323/222

(58) Field of Classification Search
USPC .................................. 323/222, 282, 283–288
See application file for complete search history.

(56) References Cited

U.S. PATENT DOCUMENTS

| | | | |
|---|---|---|---|
| 5,777,462 A * | 7/1998 | Yue | 323/285 |
| 6,798,177 B1 * | 9/2004 | Liu et al. | 323/222 |
| 7,336,509 B2 * | 2/2008 | Tallam | 363/37 |
| 2006/0061922 A1 | 3/2006 | Mihai et al. | |

FOREIGN PATENT DOCUMENTS

EP    1 209 549 A2    5/2002

OTHER PUBLICATIONS

International Search Report for International Application No. PCT/IL2008/000296, issued on Aug. 11, 2008.

* cited by examiner

*Primary Examiner* — Bao Q Vu
*Assistant Examiner* — Yemane Mehari
(74) *Attorney, Agent, or Firm* — Oliff & Berridge, PLC (57) ABSTRACT

A method for supplying bursts of substantially constant voltage to a switched load via a voltage reservoir. Based on a predetermined current that is to be sourced by the load during an active portion of a switching cycle, computing an average current that should be fed to the voltage reservoir during an inactive portion of the switching cycle to ensure that sufficient energy will stored in the voltage reservoir to supply the load without completely draining the voltage reservoir. Supplying continuous energy to the voltage reservoir at a substantially constant current equal in magnitude to said average current.

20 Claims, 5 Drawing Sheets

CONTROLLED POWER SUPPLY AND METHOD FOR PULSE LOAD

FIELD OF THE INVENTION

This invention relates to pulse load switching power supplies.

BACKGROUND OF THE INVENTION

A pulsed load or switched load is a load which requires a large supply of power intermittently. A switching mode power supply for such a load includes a switch that operates at a low frequency to allow high amplitude current to be supplied intermittently to the load. The switch "chops" a low voltage input DC source, thus converting it to a high-ripple pulsed AC voltage, which is transformed to an interface voltage that may then be used directly or rectified and smoothed to produce DC voltage, according to the application. Ripple current refers to the variation in the DC signal. Owing to the sharp changes in the current requirement when the switch is on or off, the ripple current in the current supplied by the main power supply can cause high radio frequency interference RFI which is reflected on to the main supply source if it is not suppressed.

The circuit that converts source input voltage DC to pulsed AC is known as a switching converter or simply 'converter' of which there are two principal types, 'Buck' and 'Boost' although there are several hybrids and variations. The Buck converter normally converts the voltage down so that the output voltage of the converter is lower than the input voltage to the converter by a factor $\delta$ that is equal to the duty cycle of the switch. Duty cycle is the ratio between the duration during each cycle that the switch is ON to the total time between successive pulses, i.e. the period, i.e.

$$V_{OUT} = \delta \cdot V_{IN}$$

$$\delta = \frac{T_{ON}}{T} = \frac{T_{ON}}{(T_{ON} + T_{OFF})}$$

where:
$V_{IN}$=input voltage;
$V_{OUT}$=input voltage;
$\delta$=Duty cycle
$T_{ON}$=Time when switch is ON
$T_{OFF}$=Time when switch is OFF
T=Pulse period=$(T_{ON}+T_{OFF})$ The Boost converter converts the voltage up so that the output voltage of the converter is higher than the input voltage to the converter by a factor $$\frac{1}{1-\delta},$$

where $\delta$ is equal to the duty cycle of the switch. Since $\delta$ is less than 1, the factor $$\frac{1}{1-\delta}$$

is greater than 1.

It thus emerges from the foregoing discussion that regardless of the type of converter that is employed, the output voltage of the converter is a function of the duty cycle of the switch. This allows accurate regulation of the voltage simply by controlling the duty cycle of the switch voltage, and this is easily achieved using pulse width modulation, PWM to control the pulse width during which the switching voltage pulse is ON. Since the period of the switching voltage pulse remains constant, adjusting the pulse width of the ON time varies the duty cycle of the switching voltage.

In the related art, an RFI filter at the input of the power supply is used to filter the radio frequency interference so that RFI is not reflected on to the main supply source. Maintaining the ripple current as low as possible also diminishes the conduction losses related to high root mean square (RMS) current values, which reduce the current delivery capability of the supply source. However, when a switch power supply is used in conventional circuits for supplying power as intermittent voltage bursts, the sudden voltage burst reflects on the line causing sudden and intermittent voltage reductions on the line. When very high power bursts are being supplied, the RFI filter becomes bulky and expensive.

It would therefore be desirable to provide a power supply for a switched load which allows the RFI filter to be reduced in size or even eliminated altogether, particularly when high power is being switched.

SUMMARY OF THE INVENTION

It is an object of the invention to provide a power supply for a switched load which can allow the filter to be reduced in size.

It is further object to provide such a power supply for supplying a switched load at high pulse power requirements According to a first aspect of the invention there is provided a method for supplying bursts of substantially constant voltage to a switched load via a voltage reservoir, the method comprising:

based on a predetermined current that is to be sourced by the load during an active portion of a switching cycle, computing an average current that should be fed to the voltage reservoir during an inactive portion of the switching cycle to ensure that sufficient energy will stored in the voltage reservoir to supply the load without completely draining the voltage reservoir; and supplying continuous energy to the voltage reservoir at a substantially constant current equal in magnitude to said average current.

According to a second aspect of the invention, there is provided controlled power supply for supplying bursts of substantially constant voltage from a voltage reservoir to a switched load via a load switch, said power supply including:

an average current processing unit responsive to a predetermined current that is to be sourced by the load during an active portion of a switching cycle for computing an average current that should be fed to the voltage reservoir during an inactive portion of the switching cycle to ensure that sufficient energy will stored in the voltage reservoir to supply the load without completely draining the voltage reservoir, and a controller operatively coupled to the average current processing unit for supplying continuous energy to the voltage reservoir at a substantially constant current equal in magnitude to said average current and for generating switching signals for closing and opening said load switch at a rate and duty cycle commensurate with respective durations of the active portion and the inactive portion of the switching cycle.

BRIEF DESCRIPTION OF THE DRAWINGS

In order to understand the invention and to see how it may be carried out in practice, an embodiment will now be described, by way of non-limiting example only, with reference to the accompanying drawings, in which:

FIG. 5 is a timing diagram of the voltage waveform at the output of the DC-DC converter shown in FIG. 3a;

DETAILED DESCRIPTION OF EMBODIMENTS

Figure 1:
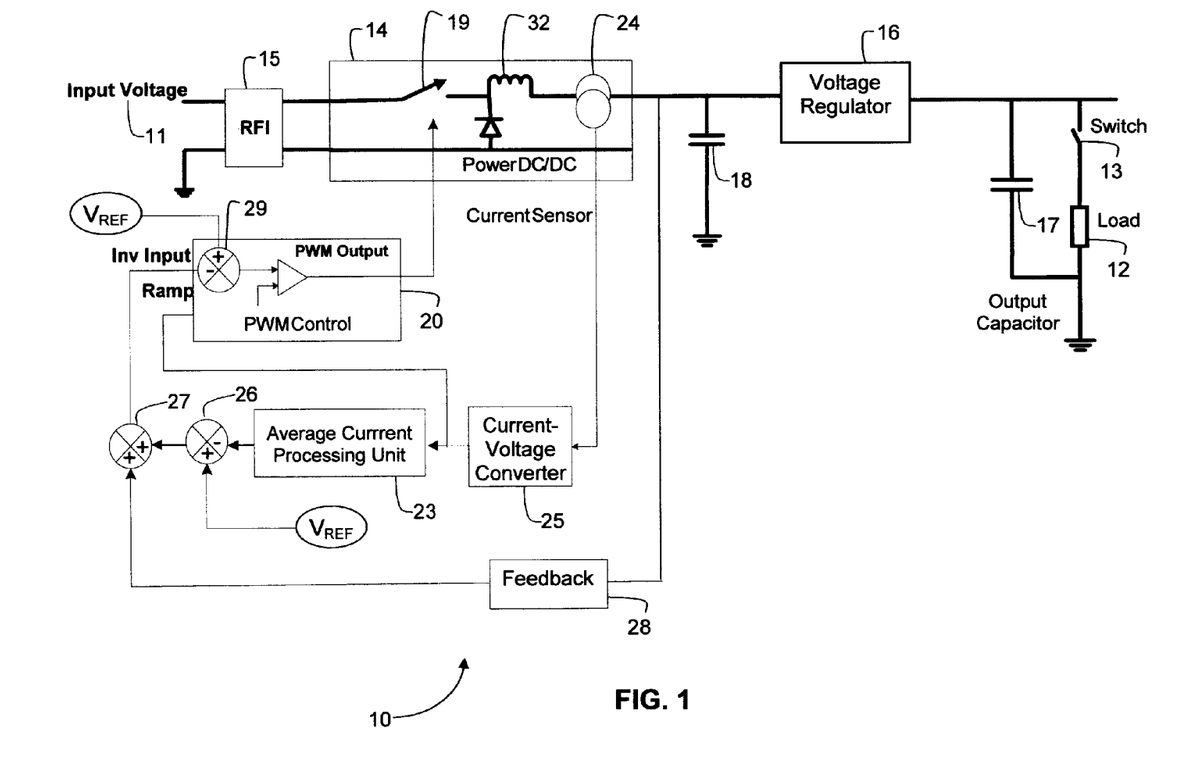
FIG. 1 is a block diagram showing functionality of a controlled power supply according to an embodiment of the invention.

FIG. 1 illustrates a controlled power supply 10 for supplying bursts of substantially constant voltage from a voltage source 11 to a switched load 12 via a controlled load switch 13, in accordance with an embodiment of the present invention. The voltage source 11 may, for example, be a rectified phase of a 3-phase power line having a rectified line voltage. It could equally well be a bank of batteries configured to provide a required line voltage. An input of a DC/DC converter 14 (constituting a switching converter) is connected to the voltage source 11 via an optional input filter 15. An output of the DC/DC converter 14 is connected to a voltage regulator 16 whose output is connected to an output capacitor 17 connected across the switched load 12. The DC/DC converter 14 includes as part of its output a voltage reservoir for storing voltage, which for the sake of explanation is shown as a storage capacitor 18 that is external to the DC/DC converter 14. The DC/DC converter 14 may be a Buck or Boost Converter as explained above and includes a switching element constituted by a PWM switch 19 that is controlled by a PWM controller 20. The PWM controller 20 is responsive to a first voltage reference $V_{REF1}$ for varying the average output voltage fed to the storage capacitor 18, which stores energy during that portion of the duty cycle when the PWM switch is ON. The storage capacitor 18 feeds voltage to the voltage regulator 16, which ensures that the voltage across the output capacitor 17 remains substantially constant and thus able to provide voltage to the load 12 whenever the load switch 13 is closed.

The voltage regulator 16 is a DC/DC variable input constant output (VICO) device and ensures that the voltage across the output capacitor 17 remains substantially constant. Under such circumstances, the energy that is fed to the load 12 when the load switch 13 is closed is effectively supplied by the storage capacitor 18, since, even when the load switch 13 is closed, the voltage across the output capacitor 17 remains almost constant. Thus most of the energy supplied to the load 12 emanates from the voltage stored in the storage capacitor 18 during that portion of the duty cycle when the PWM switch 19 is ON. The storage capacitor 18 thus constitutes a voltage reservoir for feeding substantially constant voltage to the load 12.

The power supply 10 operates to charge the storage capacitor 18 continuously during an inactive portion of the switching cycle of the load switch 13 when the load switch 13 is open, so that sufficient voltage is stored in the storage capacitor 18 to supply the load 12 during an active portion of the switching cycle when the load switch 13 is closed. Since the power supply 10 is intended for supplying short, intermittent voltage bursts to the load 12, the inactive portion of the switching cycle is much longer than the active portion. In other words, the load switch 13 has a low duty cycle. This allows energy to be stored continuously and gradually during the inactive portion of the switching cycle at a rate that ensures that sufficient voltage is stored in the storage capacitor 18 to supply the load 12 while avoiding sudden voltage surges that would give rise to corresponding drop in the line voltage. This requirement is met by an average current processing unit 23 that does two things. First, based on a predetermined current that is to be sourced by the load 12 during the active portion of the switching cycle of the load switch 13, it computes an average current that should be fed to the storage capacitor 18 during the much longer inactive portion of the switching cycle to ensure that sufficient energy will be stored in the storage capacitor 18 to supply the load without completely draining the storage capacitor 18. The predetermined current may be computed or estimated based, for example, on previous load characteristics. Secondly, the average current processing unit 23 controls the duty cycle of the PWM switch 19 in the DC/DC converter 14 so as to feed the computed current to the storage capacitor 18. In a practical implementation of the invention, the average current processing unit 23 may be a computer that controls the load switch 13, as well as the PWM switch 19, and which also determines the voltage to be fed to the load 12 as well as the duty cycle of the load switch 13 needed to achieve this voltage.

The manner in which the required control of the DC/DC converter 14 is performed is as follows. A current sensor 24 senses the DC current at the output of the DC/DC converter 14 and a current-to-voltage converter 25 coupled to the current sensor 24 produces a corresponding voltage that is proportional to the measured current. The average current processing unit 23 operates to feed the resulting voltage to the negative input an error comparator 26, whose positive input is connected to a second voltage reference, $V_{REF2}$. The error comparator 26 thus produces at its output a signal that is a function of the difference between the current produced by the DC-DC converter 14 and a desired reference current and serves as a feedback signal for ensuring that the DC-DC converter 14 operates at a desired constant current.

The output of the error comparator 26 is fed to a first input of a weighting unit 27 constituted by an adder whose second input is connected to the output of a feedback circuit 28 whose input is connected to the reservoir capacitor 18. The weighting unit 27 thus receives two voltage signals, one of which is a function of the voltage across the output capacitor 18 and the other of which is a function of the difference between the current produced by the DC-DC converter 14 and the desired reference current. The weighting unit 27 sums these two voltage signals and feeds the resulting weighted voltage signal to the negative input of an error comparator 29 in the PWM controller 20, to whose positive input is connected the first voltage reference $V_{REF1}$. The output of the error comparator 29 is thus a function of the difference between the first voltage reference $V_{REF1}$ and the weighted error signal derived by the weighting unit 27. The PWM controller 20 is responsive to the output of the error comparator 29 for adjusting the duty cycle of the PWM switch 19. The duty cycle of the PWM switch 19 determines the extent to which the storage capacitor 18 is charged during the inactive portion of the cycle when the load switch 13 is open. As noted above, the storage capacitor 18 should be sufficiently charged that it maintains some residual voltage during the active portion of the cycle when the load switch 13 is closed. To achieve this requirement, the weighted error signal balances the feedback signal indicative of the voltage across the storage capacitor 18, whereby the duty cycle of the PWM switch 19 is adjusted to ensure that the output of the DC/DC converter 14 will adequately charge the storage capacitor 18, during both the active and inactive portions of the cycle. This ensures that even during the active portion of the cycle when the load switch 13 is closed, the load 12 does not use all the energy stored in the storage capacitor 18 so that some residual voltage is always left in the storage capacitor 18. Were this not done, any slight voltage shortfalls would accumulate over time thus leading to the eventual failure of the storage capacitor 18 to provide sufficient voltage to the load 12 during the active portion of the cycle. Moreover, owing to the described operation of the weighting unit 27, the voltage fed to the load 12 is essentially supplied completely by the storage capacitor 18 and the voltage across the output capacitor 17 is substantially constant throughout the whole switching cycle. Under these circumstances the linear regulator 16 is optional.

The controlled power supply 10 thus operates to ensure that the energy supplied to the load 12 during the active portion of the switching cycle is stored by charging the storage capacitor 18 gradually during the inactive portion of the switching cycle at a constant current whose magnitude is adjusted by the average current processing unit 23 based on the power to be fed to the load 12 during a subsequent active portion of the switching cycle. This avoids sudden current surges on the input voltage source and avoids the need for a bulky RFI filter at the input of the power supply.

Figure 2:
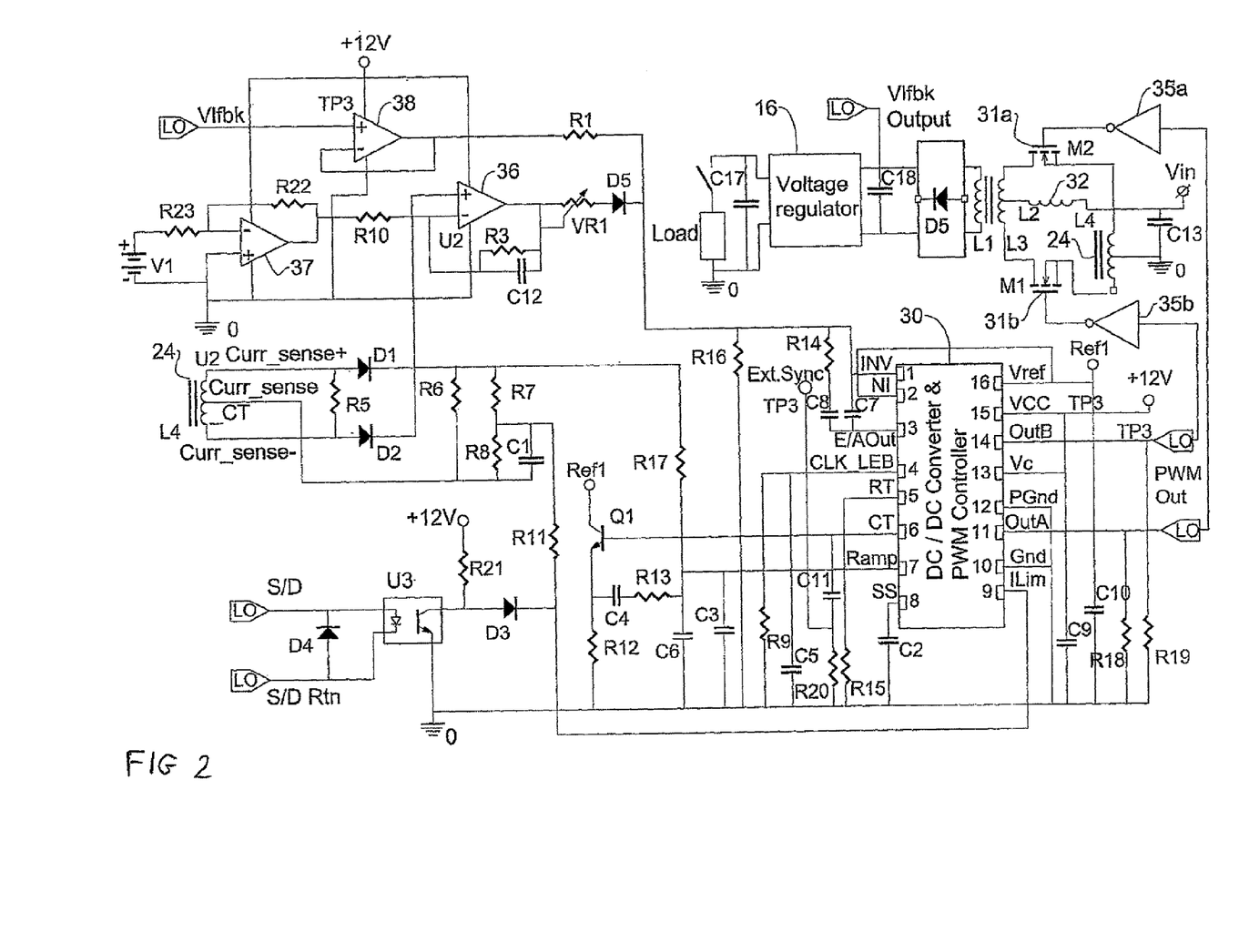
FIG. 2 is a high level circuit diagram showing details of the controlled power supply depicted functionally in FIG. 1.

Having described the principle of operation, there will now be described with reference to FIG. 2 a high level circuit diagram showing details of the controlled power supply 10 described functionally with reference to FIG. 1. The intention of FIG. 2 is to present how the components shown functionally in FIG. 1 can be implemented in practice. Therefore, only the most salient features will be described since the circuit diagram provides a fully enabling disclosure sufficient for one skilled in the art to carry out the invention.

Thus, the heart of the controlled power supply 10 is an SG1825 controller 30 which combines the functions of the DC-DC converter 14 and PWM controller 20. The first voltage reference $V_{REF1}$ is fed to a voltage reference terminal (pin 16) thereof and positive and negative DC power supply rails are connected respectively to the Vcc and GND terminals (pins 13 and 12). The load current is sensed via the current transformer 24 across which are connected respective source terminals of a pair of MOSFET switches 31a and 31b whose drain terminals are commonly connected to a coil 32 that is part of the DC/DC converter 14 and is connected to GND via the storage capacitor 18. The respective gate terminals of the MOSFET switches 31a and 31b are controlled by respective drivers 35a and 35b, that receive drive signals via the PWM output pins (11) and (14) of the SG1825 controller 30. The MOSFET switches 31a and 31b thus operate as the PWM switch 19 shown in FIG. 1.

For the sake of clarity the current transformer 24 is shown twice in the figure, i.e. in addition with regard to its connection to the SG1825 controller 30, it is also shown with regard to its signaling. Thus, its output representative of the input voltage $V_{IN}$ is coupled via a pair of rectifier diodes D1 and D2, whose respective cathodes are commonly connected to a resistor R6, across which there is thus produced a voltage that is proportional to the current sensed by current transformer 24. The resistor R6 thus functions as the current-to-voltage converter 25 shown in FIG. 1. The positive terminal of the resistor R6 is connected to the positive input of an OP AMP 36 to whose negative input is fed the reference voltage $V_{REF2}$ via a resistor R10. The reference voltage $V_{REF2}$ is derived at the output of an OP AMP 37 that is connected as an inverting amplifier whose input is fed to a variable DC source. A capacitor C12 and a resistor R3 are connected between the negative input and the output of the OP AMP 36. The OP AMP 36 thus operates as an integrator and functions as the average current processing unit 23 shown in FIG. 1. In accordance with one embodiment, the values of the capacitor C12 and the resistor R10 are selected so as to set the integration averaging interval to be one order of magnitude larger than the largest expected pulse load interval.

The output of the OP AMP 36 is fed to a variable resistor R2 connected to the anode of a rectifier diode D5, whose cathode is coupled to the inverting input (pin 1) of the SG1825 controller 30. The feedback voltage at the output of the linear regulator 16, and shown as 28 in FIG. 1, is coupled to the positive input of an OP AMP 38 connected as a voltage buffer whose output is coupled via a resistor R1 to the cathode of the rectifier diode D5 and thence to the inverting input of the SG1825 controller 30. The combination of the resistors R1 and R2 together with the rectifier diode D5 thus functions as the weighting unit 27 shown in FIG. 1, whose output is the sum of the feedback voltage 28 and the output of the OP AMP 36, corresponding to the average current processing unit 23 shown in FIG. 1.

Pins 5 and 6 of the controller 30 allow for connection of external timing components $R_T$ and $C_T$ constituted by a resistor R20 and a capacitor C11 for adjusting the frequency of an internal oscillator. Pin 8 of the SG1825 controller 30 is a soft-start input that is held low when either the controller is in the micro-power mode, or when a voltage greater than +1.4 volts is present on pin 9. Thus, by applying a voltage signal of sufficient amplitude across the diode D4, the optocoupler U3 feeds a shut down signal via diode D3 to Pin 9 of the controller.

Figure 3A:
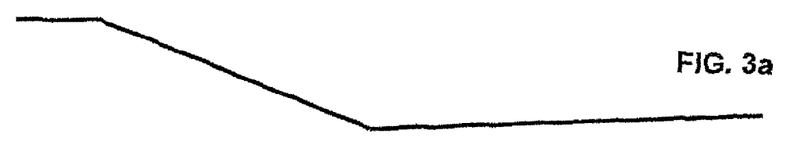
FIGS. 3a to 3d are graphical representations showing current and voltage waveforms associated with the controlled power supply shown in FIG. 1 all drawn to a common time scale.
Figure 3B:
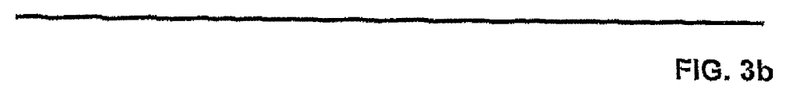
Figure 4:
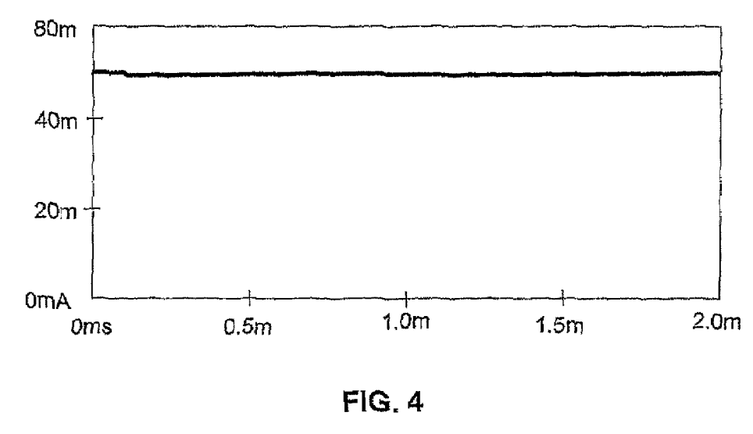
FIG. 4 is a timing diagram of the input current waveform shown in FIG. 3b.
Figure 5:
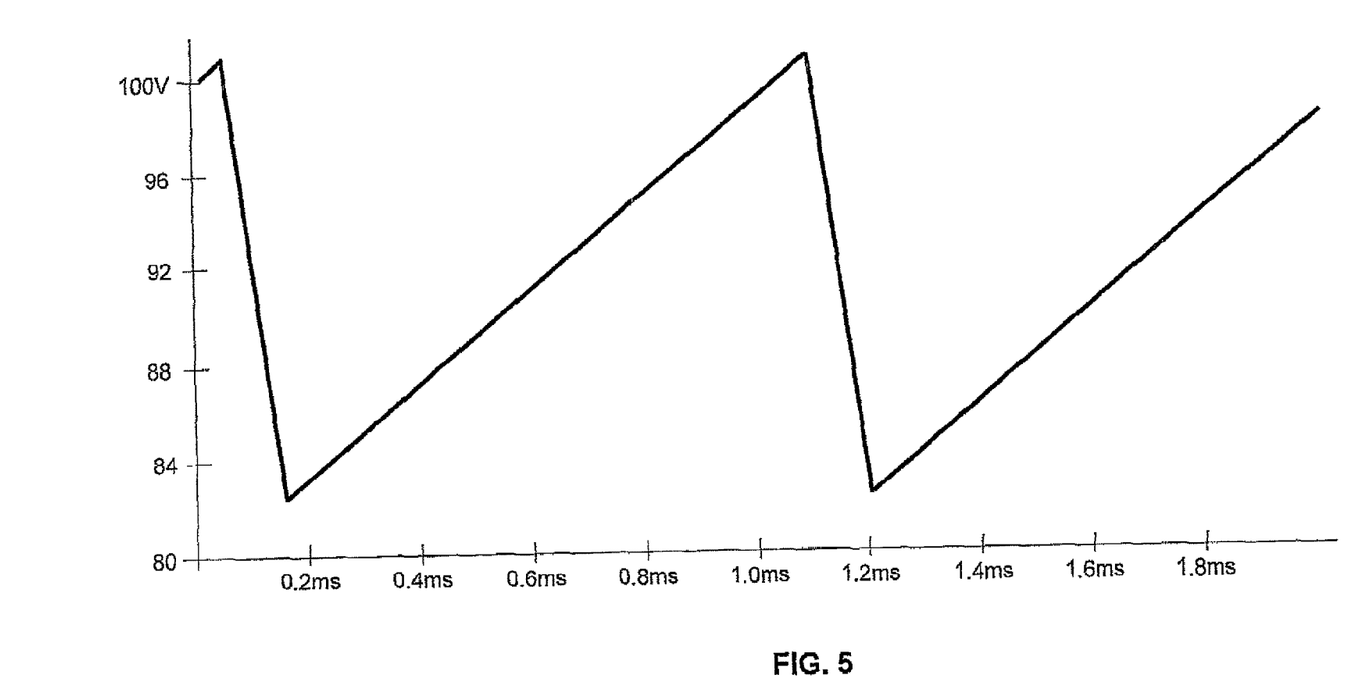

FIGS. 3a to 3d are graphical representations showing current and voltage waveforms associated with the controlled power supply shown in FIG. 1 all drawn to a common time scale;

FIG. 4 is a timing diagram of the input current waveform shown in FIG. 3b as measured by the current sensor 24 shown in FIG. 1;

FIG. 5 is a timing diagram of the voltage waveform at the output of the DC-DC converter. This corresponds to the waveform across the storage capacitor 18 as shown qualitatively in FIG. 3a. However, the time base in FIG. 3a is much more spread out in that the time for the voltage to fall from 101V to 82V is seen in FIG. 5 to be approximately 0.1 ms, which indicates that FIG. 3a shows the voltage only over a period of approximately 0.25 ms of which approximately 0.12 ms relates to the subsequent voltage increase, shown only partially in FIG. 3a. The time for the storage capacitor 18 to fully charge to its full voltage of 101V is seen in FIG. 5 to be just under 1 ms. This implies that only approximately 1-tenth the charging cycle is shown in FIG. 3a.

Figure 3C:
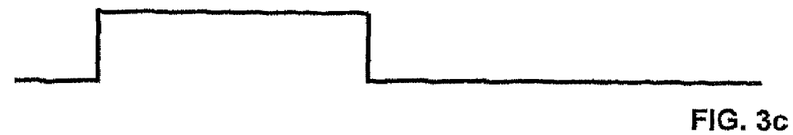
Figure 3D:
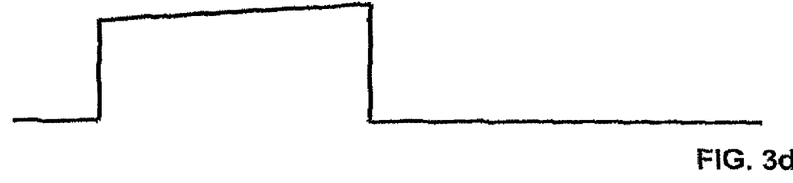
Figure 6:
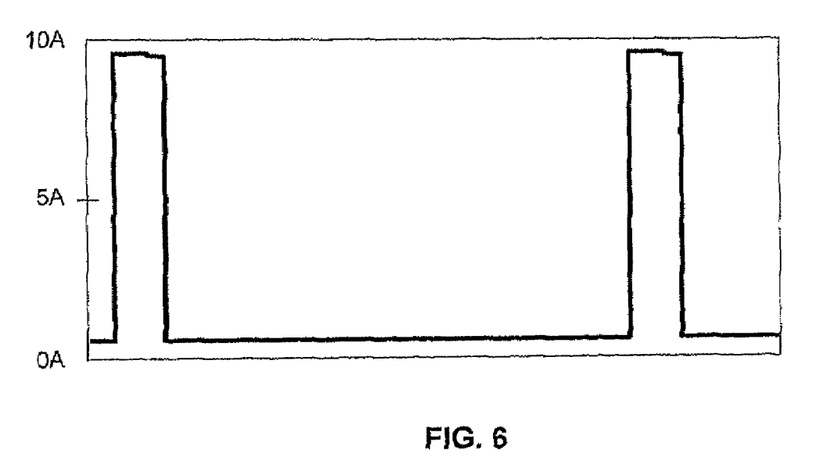
FIG. 6 is a timing diagram of the current waveform fed to the pulsed load shown in FIG. 3c.
Figure 7:
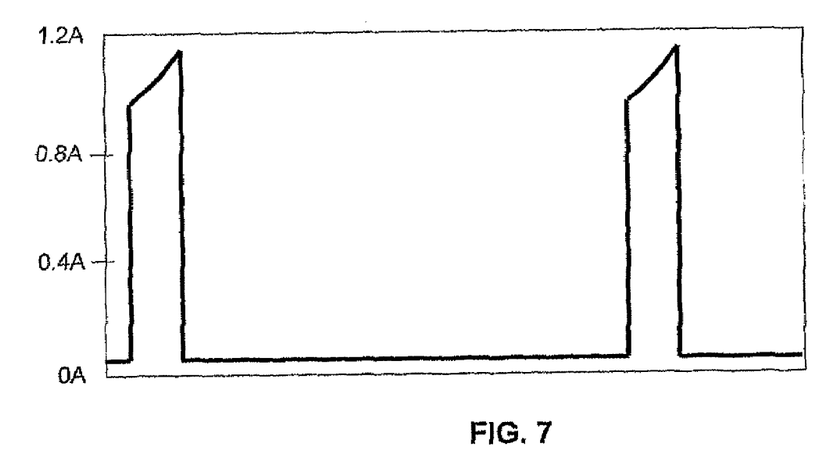
FIG. 7 is a timing diagram of the input current waveform to the regulator shown in FIG. 3d.

FIG. 6 is a timing diagram of the current waveform fed to the pulsed load 12 as shown qualitatively in FIG. 3c; and FIG. 7 is a timing diagram of the input current waveform to the regulator 16 as shown qualitatively in FIG. 3d. It emerges from a comparison of the time bases of FIGS. 6 and 7 with that of FIG. 3a that the pulse widths have an approximate duration of 0.1 ms (i.e. the time for the voltage across the storage capacitor 18 to fall from 101V to 82V), which is approximately 1-tenth of the duty cycle.

It thus emerges from the above discussion that the storage capacitor 18 is charged gradually over nine-tenths of its duty cycle and discharged abruptly across the load 12 for only one-tenth of the duty cycle, so that it stored voltage falls only from approximately 101V to 82V, thus maintaining most of its charge. By such means the load on the input, as shown in FIG. 4, remains substantially constant.

Although the invention has been described with particular regard to use of a DC power supply for supplying power to the load, it will be understood that a rectified AC power supply may also be used.

The invention claimed is:

1. A method of supplying bursts of substantially constant voltage to a switched load via a voltage reservoir, the method comprising:
    based on a current that is to be sourced by the switched load during an active portion of a switching cycle, computing an average current that should be fed to the voltage reservoir during the switching cycle to ensure that sufficient energy will be stored in the voltage reservoir to supply the switched load without completely draining the voltage reservoir; and
    supplying continuous energy to the voltage reservoir via a switching converter at a substantially constant current equal in magnitude to said average current.

2. The method according to claim 1, further comprising setting an integration averaging interval of the switching converter to be an order of magnitude larger than a largest expected pulse load interval.

3. A controlled power supply configured to supply bursts of substantially constant voltage from a voltage reservoir to a switched load via a load switch, said power supply comprising:
    an average current processing unit operable to compute, in response to a current that is to be sourced by the switched load during an active portion of a switching cycle, an average current that should be fed to the voltage reservoir during the switching cycle to ensure that sufficient energy will stored in the voltage reservoir to supply the switched load without completely draining the voltage reservoir; and
    a controller operatively coupled to the average current processing unit for controlling supplying of continuous energy to the voltage reservoir at a substantially constant current equal in magnitude to said average current.

4. The controlled power supply according to claim 3, further comprising:
    a switching converter controlled by a pulse width modulation (PWM) switch for coupling to a voltage source and producing an output voltage; and
    a storage capacitor for storing energy and for supplying stored energy to the switched load during the active portion of the load switching cycle; wherein said controller being coupled to the switching converter for pulse width modulating the PWM switch.

5. The controlled power supply according to claim 3, wherein the average current processing unit comprises an integrator having a capacitor and a resistor selected so as to set an integration averaging interval of the integrator to be an order of magnitude larger than the largest expected pulse load interval of the switching converter.

6. A method for supplying bursts of substantially constant voltage to a switched load via a voltage reservoir, the method comprising:
    computing an average current that should be fed to the voltage reservoir, wherein the computing is responsive to an estimation of the current that is to be sourced by the switched load during an active portion of a switching cycle of the switched load;
    continuously supplying energy to the voltage reservoir at a substantially constant current; and
    controlling a magnitude of the substantially constant current, during the continuous supplying, to correspond to the computed average current.

7. The method according to claim 6, wherein the supplying of the continuous energy comprises feeding the energy to the voltage reservoir via a switching converter; and wherein the method further comprises varying a duty cycle of the switching converter to produce a desired average current.

8. The method according to claim 7, wherein the varying comprises varying the duty cycle of the switching converter so as to maintain the current supplied by the switching converter at a level slightly above an average current required by the load.

9. A controlled power supply configured to supply bursts of substantially constant voltage from a voltage reservoir to a switched load via a load switch, said power supply comprising:
    an average current processing unit operable to compute an average current that should be fed to the voltage reservoir, in response to an estimation of the current that is to be sourced by the switched load during an active portion of a switching cycle of the switched load; and
    a controller operatively coupled to the average current processing unit, wherein the controller is operable to control a magnitude of a substantially constant current that continuously supplies energy to the voltage reservoir to correspond to the computed average current.

10. The controlled power supply according to claim 9, wherein the controller is further configured to generate switching signals for closing and opening said load switch at a rate and duty cycle commensurate with respective durations of the active portion and an inactive portion of the switching cycle.

11. The controlled power supply according to claim 10, wherein said durations are varied to produce a desired average current or to maintain the current at a level slightly above the average current required by said switched load.

12. The controlled power supply according to claim 9, wherein the controller is operable to generate switching signals so that respective durations of the active portion and an inactive portion of the switching cycle are varied to produce a desired average current or to maintain the current at a level slightly above the average current required by said switched load.

13. The controlled power supply according to claim 9, wherein the controller is operable to control the supply of energy to the voltage reservoir from a voltage source that is a rectified phase of a 3-phase power line having a rectified line voltage.

14. The controlled power supply according to claim 9, further comprising a buck converter controllable by the controller for supplying the continuous energy to the voltage reservoir, wherein the converter is operable to convert an input voltage to which it is coupled to an output voltage that is provided to the voltage reservoir and which is lower than the input voltage to the converter.

15. The controlled power supply according to claim 9, further comprising a boost converter controllable by the controller for supplying the continuous energy to the voltage reservoir, wherein the converter is operable to convert an input voltage to which it is coupled to an output voltage that is provided to the voltage reservoir and which is higher than the input voltage to the converter.

16. The controller power supply according to claim 15, further comprising a current-to-voltage converter coupled to the current sensor that is operable to produce a corresponding voltage proportional to the measured current; and a first comparator operable to compare the voltage corresponding to the direct current sensed by the current sensor to a voltage reference, wherein the controller is operable to control the supply of the continuous energy to the voltage reservoir in response to a result of the comparison by the first comparator.

17. The controlled power supply according to claim 9, further comprising:
    a converter operable to convert input voltage inputted to the converter to an output of a different voltage that is fed to the voltage reservoir; and
    a current sensor operable to sense direct current at an output of the converter;
    wherein the controller is operable to control the current of the supply of the continuous energy to the voltage reservoir in response to a difference between the current sensed by the current sensor and a desired reference current.

18. The controlled power supply according to claim 17, further comprising a weighing unit adder comprising a first input coupled to an output of the first comparator and a second input coupled to an output of a feedback circuit operable to provide an output that is responsive to a voltage of the voltage reservoir, wherein the controller is operable to control the supply of the continuous energy to the voltage reservoir in response to a result of an addition by the weighing unit adder of its two inputs.

19. The controlled power supply according to claim 9, further comprising a converter operable to convert input voltage inputted to the converter to an output of a different voltage that is fed to the voltage reservoir; and a second comparator that is operable to compare a reference voltage to a sum of a first voltage signal that is responsive to voltage across the voltage reservoir and a second voltage signal that is responsive to a difference between current produced by the converter and a desired reference current; wherein the controller is operable to control the supply of the continuous energy to the voltage reservoir in response to a result of the comparison by the second comparator.

20. The controlled power supply according to claim 9, comprising a converter operable to convert input voltage inputted to the converter to an output of a different voltage that is fed to the voltage reservoir; wherein an output of the converter exceeds a voltage of 82 Volts.

* * * * *